(12) United States Patent
Roundy et al.

(10) Patent No.: US 10,534,933 B1
(45) Date of Patent: Jan. 14, 2020

(54) ENCRYPTING AND DECRYPTING SENSITIVE FILES ON A NETWORK DEVICE

(71) Applicant: SYMANTEC CORPORATION, Mountain View, CA (US)

(72) Inventors: Kevin Alejandro Roundy, El Segundo, CA (US); Yuqiong Sun, Mountain View, CA (US); Christopher Gates, Marina Del rey, CA (US); Michael Hart, Farmington, CT (US); Saurabh Shintre, Sunnyvale, CA (US); Brian T. Witten, Hermosa Beach, CA (US)

(73) Assignee: Symantec Corporation, Mountain View, CA (US)

( * ) Notice: Subject to any disclaimer, the term of this patent is extended or adjusted under 35 U.S.C. 154(b) by 194 days.

(21) Appl. No.: 15/856,040

(22) Filed: Dec. 27, 2017

(51) Int. Cl.
  *G06F 21/00* (2013.01)
  *G06F 21/62* (2013.01)
  *H04L 29/06* (2006.01)
  *G06F 21/31* (2013.01)
  *G06F 21/53* (2013.01)

(52) U.S. Cl.
  CPC .......... *G06F 21/6245* (2013.01); *G06F 21/31* (2013.01); *G06F 21/53* (2013.01); *G06F 21/6227* (2013.01); *H04L 63/06* (2013.01); *H04L 63/0884* (2013.01); *H04L 2463/082* (2013.01)

(58) Field of Classification Search
  CPC ...... G06F 21/31; G06F 21/53; G06F 21/6227; G06F 21/6245; G06F 63/06; G06F 63/0884
  See application file for complete search history.

(56) References Cited

U.S. PATENT DOCUMENTS

| 10,171,500 | B2* | 1/2019 | Lal | .......................... H04L 63/20 |
| 2017/0177505 | A1* | 6/2017 | Basak | .................... G06F 3/0661 |
| 2017/0286320 | A1* | 10/2017 | Chhabra | ............. G06F 12/1408 |

(Continued)

OTHER PUBLICATIONS

A. Ferraiuolo et al., "Komodo: Using verification to disentangle secure-enclave hardware from software"; published in "Proceedings of the SOSP '17" on Oct. 28, 2017, Shanghai, China, 19 pages.

(Continued)

*Primary Examiner* — Beemnet W Dada
(74) *Attorney, Agent, or Firm* — Maschoff Brennan

(57) ABSTRACT

Encrypting and decrypting sensitive files on a network device. In one embodiment, a method may include determining that a file stored on a network device is a sensitive file, encrypting the sensitive file, sending, to an authentication server, an encryption key, initializing, at the network device, a Software Guard Extension (SGX) enclave, loading, into the SGX enclave, a retrieval application, receiving, at the retrieval application, an attestation from the authentication server that the retrieval application is authentic, receiving, at the retrieval application, the encryption key from the authentication server, receiving, at the retrieval application, a user request to decrypt the encrypted sensitive file, authenticating, at the retrieval application, the user request, decrypting, at the network device, the particular encrypted sensitive file, and providing the sensitive file to the user.

20 Claims, 4 Drawing Sheets

(56) References Cited

U.S. PATENT DOCUMENTS

2017/0288874 A1* 10/2017 Narendra Trivedi ........................ H04L 9/3234
2018/0114013 A1* 4/2018 Sood ........................ G06F 21/53

OTHER PUBLICATIONS

Hatchman, Mark, "How Intel Core chips and Lenovo PCs could take over two-factor authentication from your phone", web page accessed on Dec. 19, 2017 located at: https://www.pcworld.com/article/3221420/security/how-intel-core-chips-could-take-over-two-factor-authentication-from-your-phone.html, Oct. 24, 2017, 4 pages.
Intel, "Secure Your Digital Life with Intel Technology", web page accessed on Dec. 19, 2017 located at: https://www.intel.com/content/www/us/en/security/online-connect.html, 2 pages.
U.S. Appl. No. 14/138,138, filed Dec. 23, 2013, titled "System and Methods for Discovering Application-Layer Topologies of Networks", 47 pages.

* cited by examiner

US 10,534,933 B1

ENCRYPTING AND DECRYPTING SENSITIVE FILES ON A NETWORK DEVICE

BACKGROUND

Network devices typically store a variety of files. Some of these files may be sensitive files due to the files including sensitive data. For example, a user may store a sensitive file on the user's network device that includes sensitive data of the user related to criminal records, health records, tax records, financial records, educational records, government numbers (e.g., a social security number or a driver's license number), and user passwords.

Purveyors of malicious applications, such as viruses or malware, may attempt to exploit the storing of sensitive files on network devices by tricking users into installing and executing the malicious applications on the network devices and then using the malicious applications to access and steal sensitive data from the sensitive files.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for encrypting and decrypting sensitive files on a network device may be performed, at least in part, by a computing device including one or more processors. The method may include (a) determining, at a network device, that a file stored on the network device is a sensitive file, (b) encrypting, at the network device, the sensitive file, (c) sending, to an authentication server, an encryption key, (d) initializing, at the network device, a Software Guard Extension (SGX) enclave, (e) loading, into the SGX enclave, a retrieval application, (f) receiving, at the retrieval application, an attestation from the authentication server that the retrieval application is authentic, (g) receiving, at the retrieval application, the encryption key from the authentication server, (h) receiving, at the retrieval application, a user request to decrypt the encrypted sensitive file, (i) authenticating, at the retrieval application, the user request based on a user credential provided by the user, (j) authenticating, at the retrieval application, the user request based on a second factor authentication key provided by the user, (k) decrypting, at the network device, the particular encrypted sensitive file, and (l) providing the sensitive file to the user.

In some embodiments, the determining, at a network device, that the file stored on the network device is a sensitive file may include identifying the file in a list of previously-identified sensitive files. In these embodiments, the list of previously-identified sensitive files may exclude files that are accessed within a particular frequency.

In some embodiments, the initializing, at the network device, of the SGX enclave may include initializing, at the network device, of the SGX enclave using an Intel® processor of the network device that supports Intel® SGX instructions. Alternatively, in some embodiments, the initializing, at the network device, of the SGX enclave may include initializing, at the network device, of the SGX enclave using an OpenSGX simulator, or a Komodo monitor, that supports Intel® SGX instructions.

In some embodiments, the actions (h)-(l) may be performed while the network device is online and maintains network communication with the authentication server. Alternatively, in some embodiments, one or more of the actions (h)-(l) may be performed while the network device is offline and does not maintain network communication with the authentication server.

In some embodiments, the method may further include building, at the network device, a search index of the sensitive file, encrypting, at the network device, the search index using the encryption key, receiving, at the retrieval application, a user request to search the encrypted sensitive file, decrypting, at the retrieval application, the search index, and searching, at the retrieval application, the search index based on the user request to produce search results. In these embodiments, the receiving at action (h) may include receiving, at the retrieval application, the user request to decrypt the encrypted sensitive file based on a selection of one of the search results.

Also, in some embodiments, one or more non-transitory computer-readable media may include one or more computer-readable instructions that, when executed by one or more processors, cause the one or more processors to perform a method for encrypting and decrypting sensitive files on a network device.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
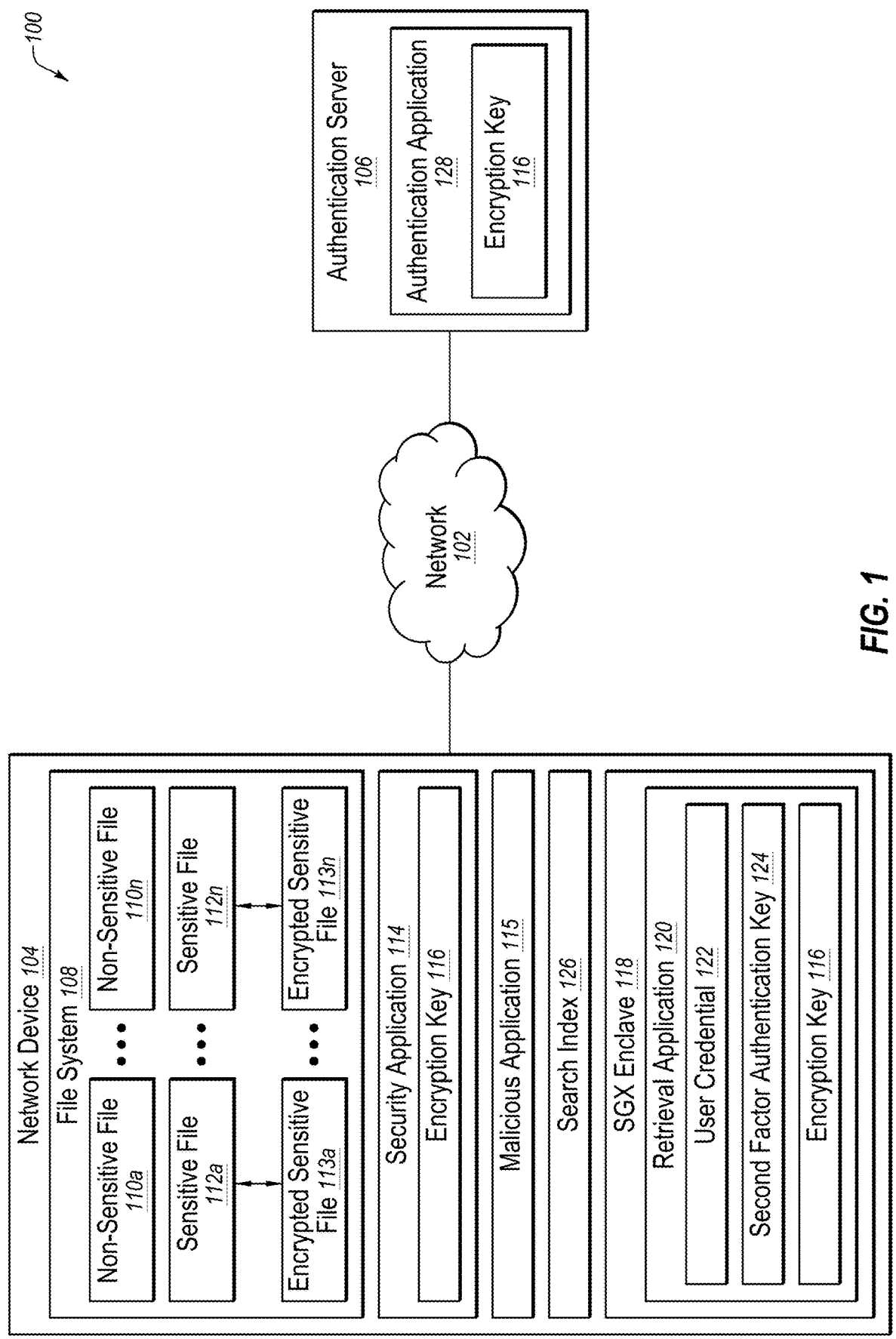
FIG. 1 illustrates an example system configured for encrypting and decrypting sensitive files on a network device.

Network devices typically store sensitive files that include sensitive data. Purveyors of malicious applications, such as viruses or malware, may attempt to exploit the storing of sensitive files on network devices by tricking users into installing and executing the malicious applications on the network devices and then using the malicious applications to access and steal sensitive data from the sensitive files.

One method for preventing malicious applications from accessing and stealing sensitive data from sensitive files may include encrypting all files stored on a network device. Encrypting all files stored on a network device may prevent a malicious application executing on the network device from accessing any sensitive data stored in any of the encrypted files that are sensitive files. However, once a file is encrypted, a legitimate access of the file by a user of the network device may require that the encrypted file first be decrypted, which takes time and processing resources. Further, where all files stored on a network device are encrypted, the files may not be indexed for searching through the data in the files, which may limit a user's ability to quickly find a particular file with particular data. Therefore, employing a method that encrypts all files stored on a network device in order to prevent malicious applications from accessing and stealing any sensitive data stored in any of the encrypted files that are sensitive files may be overly burdensome for a user of the network device.

Some embodiments disclosed herein may enable encrypting and decrypting sensitive files on a network device. In particular, some embodiments may determine which files stored on a network device are sensitive files, encrypting the sensitive files, and then sending an encryption key to an authentication server. Then, an SGX enclave may be initialized on the network device and a retrieval application may be loaded into the SGX enclave. The retrieval application may then receive an attestation from the authentication server that the retrieval application is authentic, as well as receiving the encryption key. Then, once a user request for the encrypted sensitive file has been authenticated based on a user credential and a second factor authentication key, the retrieval application may decrypt the encrypted sensitive file and the sensitive file may be provided to the user.

In these embodiments, instead of encrypting all files stored on the network device (including non-sensitive files), only sensitive files may be encrypted, thus avoiding the time and processing resources that may be required to encrypt and decrypt non-sensitive files. Also, in these embodiments, before sensitive files are encrypted, a search index of the data in the sensitive files may be built and then this search index may be employed after the sensitive files are encrypted to allow a user to securely search through the encrypted sensitive files without first decrypting the sensitive files, which may maintain the user's ability to quickly find a particular sensitive file with particular data. Therefore, employing these embodiments may prevent malicious applications from accessing and stealing any sensitive data stored in any sensitive files without being overly burdensome for a user of the network device.

Turning to the figures, FIG. 1 illustrates an example system 100 configured for encrypting and decrypting sensitive files on a network device. The system 100 may include a network 102, a network device 104, and an authentication server 106.

In some embodiments, the network 102 may be configured to communicatively couple the network device 104 to the authentication server 106. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 3:
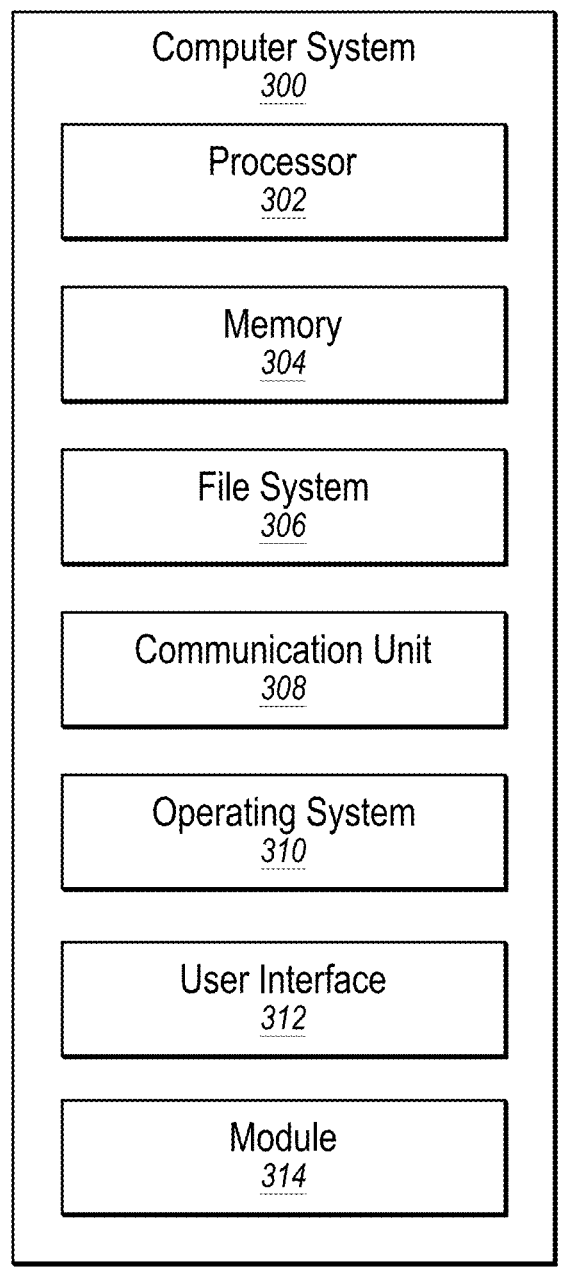
FIG. 3 illustrates an example computer system that may be employed in encrypting and decrypting sensitive files on a network device.

In some embodiments, the network device 104 may be any computer system capable of communicating over the network 102, examples of which are disclosed herein in connection with the computer system 300 of FIG. 3. The network device 104 may include a file system 108, a security application 114, a malicious application 115, and an SGX enclave 118.

In some embodiments, the file system 108 may include various files. Each file in the file system 108 may generally be categorized as either a sensitive file if the file includes sensitive data or a non-sensitive file if the file does not contain sensitive data. For example, the file system 108 may include both non-sensitive files 110a-110n and sensitive files 112a-112n.

In some embodiments, the malicious application 115 may be an application that was installed on the network device 104 by a purveyor of the malicious application 115 without the knowledge of a user of the network device 104. For example, the malicious application 115 may be as one or more of a spyware, a virus, a malware, a worm, a logic bomb, a trapdoor, a Trojan horse, a Remote Admin Trojan (RAT), a malware, a ransomware, a mobile malicious code, a malicious font, and a rootkit.

In some embodiments, the security application 114 may be configured to prevent malicious applications, such as the malicious application 115, from accessing and stealing sensitive data from the sensitive files 112a-112n. For example, the security application 114 may be configured to encrypt the sensitive files 112a-112n, resulting in encrypted sensitive files 113a-113n. The malicious application 115 may then be prevented from gaining access to sensitive data in the encrypted sensitive files 113a-113n due to the sensitive data being encrypted. The security application 114 may be further configured to build a search index 126 of the sensitive files 112a-112n prior to the encryption of the sensitive files 112a-112n, encrypt the search index, send an encryption key 116 to the authentication server 106, perform authentication based on a user credential and/or based on a second factor authentication key, and/or perform other functions as disclosed in greater detail in connection with FIGS. 2A-2B herein. Further, the security application 114 may be configured to keep a log of each time an encrypted sensitive file is accessed for use by a user behavior analysis (UBA) application in order to detect malicious behavior by a user with respect to fine-grained access patterns of sensitive files. In some embodiments, the security application 114 may include, or be part of, a network security application, such as Symantec's Norton Mobile Security application, Symantec's Endpoint Protection application, and/or Symantec's VIP Access application.

In some embodiments, the SGX enclave 118 may be initialized using Intel® Software Guard Extension (SGX) technology configured for application developers who are seeking to protect select code and data from disclosure or modification. Intel® SGX makes such protections possible through the use of SGX enclaves, which are protected areas of execution in memory. Application code can be put into an SGX enclave by special instructions and software made available to developers via the Intel® SGX SDK. The SDK is a collection of APIs, libraries, documentation, sample source code, and tools that allow software developers to create and debug applications enabled for Intel® SGX in C and C++. For example, the SGX enclave may be initialized using an Intel® processor of the network device 104 that supports Intel® SGX instructions. Alternatively, the SGX enclave 118 may be initialized using an OpenSGX simulator, or a Komodo monitor, that supports Intel® SGX instructions. Therefore, the SGX enclave 118 may be initialized using an Intel® SGX platform or another non-Intel® platform that supports Intel® SGX instructions and provides Intel® SGX guarantees.

In some embodiments, the SGX enclave 118 may be employed as a secure wrapper or container in which to execute a retrieval application 120. The retrieval application 120 may be configured to receive the encryption key 116 from the authentication server 106. The retrieval application 120 may then be configured to authenticate a user request received by the network device 104 by authenticating both a user credential 122 and a second factor authentication key 124 from the user. The retrieval application 120 may then be configured to selectively decrypt one of the encrypted sensitive files 113a-113n that is requested in the authenticated user request, resulting in the user being able to gain access to sensitive data in the requested one of the sensitive files 112a-112n due to the sensitive data no longer being encrypted. The retrieval application 120 may further be configured to decrypt the search index 126 of the sensitive files 112a-112n to enable the authenticated user to securely search through the data of the sensitive files 112a-112n without first decrypting the encrypted sensitive files 113a-113n. The retrieval application 120 may be further configured to perform other functions as disclosed in greater detail in connection with FIGS. 2A-2B herein. Further, the retrieval application 120 may be configured to include user behavior analytics and security notification functionalities. In some embodiments, the retrieval application 120 may include, or be part of, a network security application, such as Symantec's Norton Mobile Security application or Symantec's Endpoint Protection application.

In some embodiments, the authentication server 106 may be any computer system capable of communicating over the network 102 and capable of providing authentication functionality to the network device 104, examples of which are disclosed herein in connection with the computer system 300 of FIG. 3. In some embodiments, the authentication server 106 may be employed by an organization that manages the network 102 and/or the network device 104, or that needs to protect sensitive files on the network device 104, such as an employer who allows an employee to use a personal network device on the employer's network. In some embodiments, the authentication server 106 may include an authentication application 128 that may be configured to cooperate with the security application 114 and the retrieval application 120 in preventing malicious applications, such as the malicious application 115, from accessing and stealing sensitive data from the sensitive files 112a-112n. For example, the authentication application 128 may be configured to securely receive and send the encryption key 116, and to perform other functions as disclosed in greater detail in connection with FIGS. 2A-2B herein. In some embodiments, the authentication application 128 may include, or be part of, a network security application, such as Symantec's Norton Mobile Security application or Symantec's Endpoint Protection application.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1.

Figure 2A:
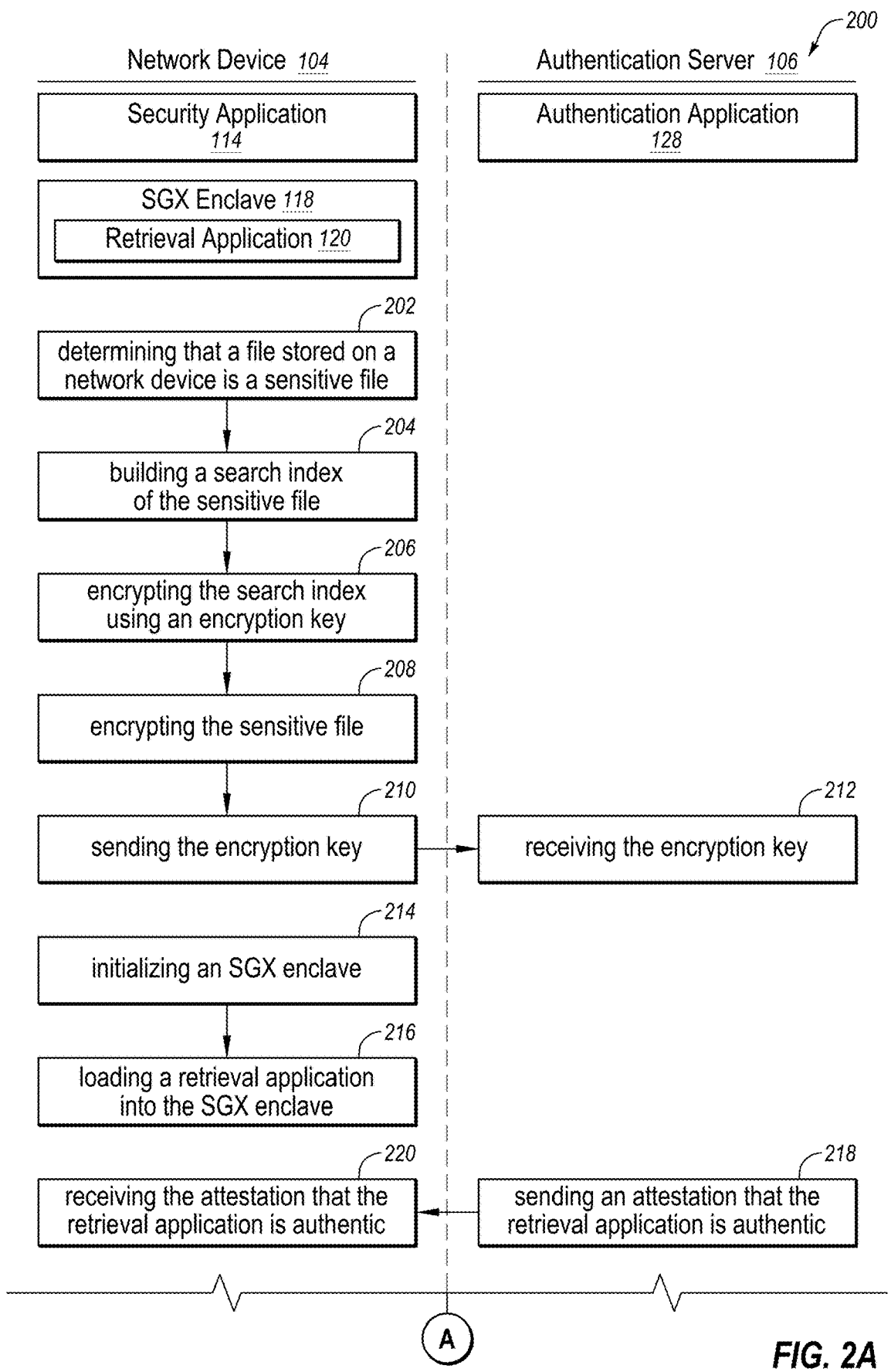
FIGS. 2A-2B are a flowchart of an example method for encrypting and decrypting sensitive files on a network device.
Figure 2B:
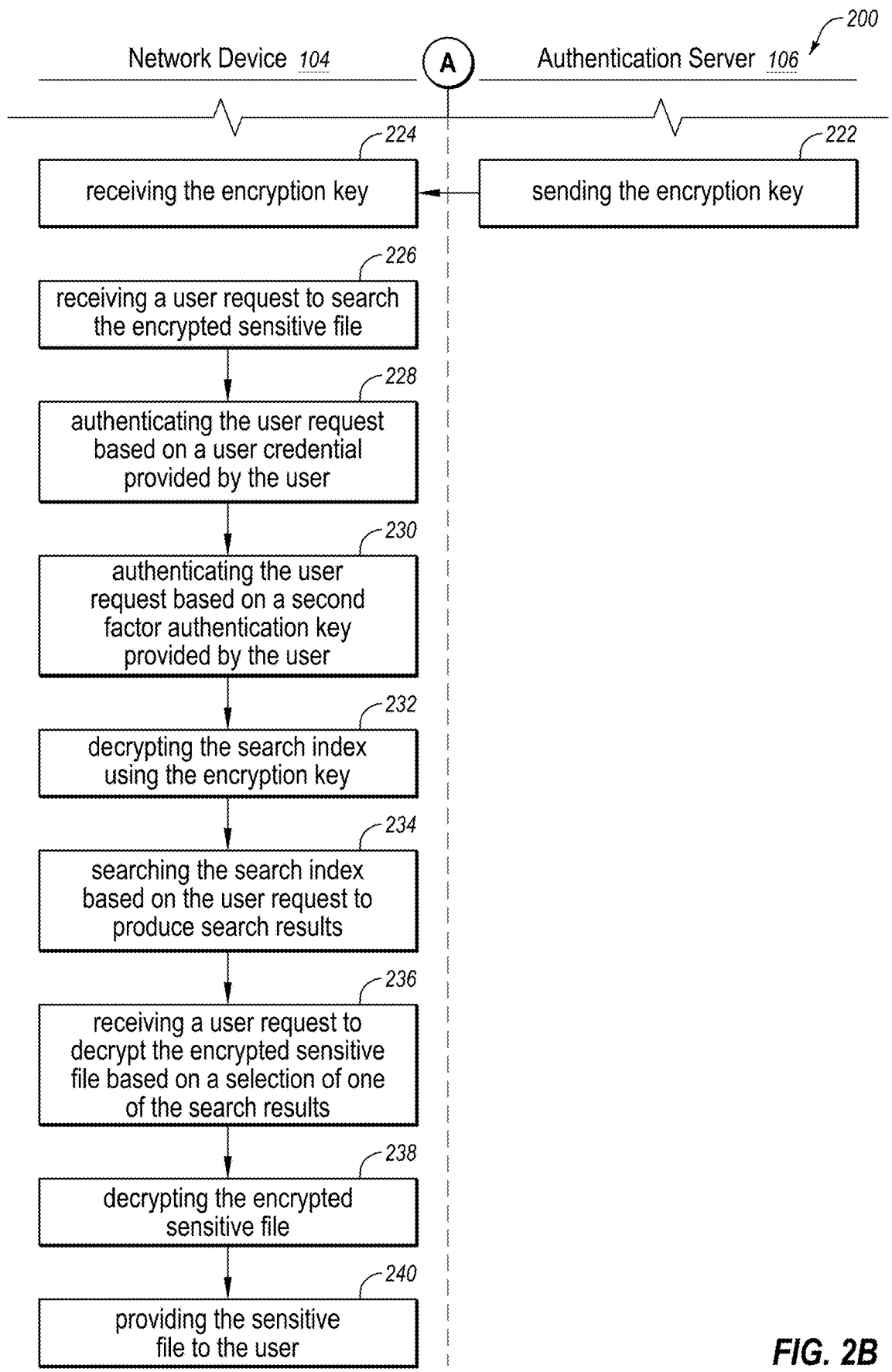

FIGS. 2A-2B are a flowchart of an example method 200 for encrypting and decrypting sensitive files on a network device. The method 200 may be performed, in some embodiments, by a device or system, such as by the security application 114 and/or the retrieval application 120 executing on the network device 104 and/or the authentication application 128 executing on the authentication server 106 of FIG. 1. In these and other embodiments, the method 200 may be performed by one or more processors based on one or more computer-readable instructions stored on one or more non-transitory computer-readable media. The method 200 will now be described in connection with FIGS. 1 and 2A-2B.

The method 200 may include, at action 202, determining that a file stored on a network device is a sensitive file. In some embodiments, the determining, at a network device, that the file stored on the network device is a sensitive file may include identifying the file in a list of previously-identified sensitive files. In these embodiments, the list of previously-identified sensitive files may exclude files that are accessed within a particular frequency. For example, the security application 114 may determine, at action 202, that the sensitive file 112a stored in the file system 108 of the network device 104 is a sensitive file based on identifying the sensitive file 112a in a list of previously-identified sensitive files. This list of previously-identified sensitive files may selectively exclude some sensitive files that are accessed with a particular threshold frequency (e.g., accessed at least daily, projected to be accessed within the next day, etc.) in order to balance the need for encryption with the need to avoid burdening a user with encryption and decryption of files that a user is likely to access in the near future. Thus, in some embodiments, only sensitive files that are accessed infrequently (e.g., not in regular use) may be identified at the action 202 (and later encrypted at the action 208, discussed below), resulting in a user-pain versus security tradeoff or a near-term file-access probability versus data sensitivity tradeoff.

In some embodiments, the identifying of sensitive files at action 202 may be performed using a machine learning classifier that is trained over file metadata features to efficiently identify files that have more than a threshold probability of containing sensitive data. Additionally, the data in the files may then be scanned for sensitive data using data loss prevention techniques.

The method 200 may include, at action 204, building a search index of the sensitive file. For example, the security application 114 may build, at action 204, the search index 126 of the sensitive file 112a (and other sensitive files that are to be encrypted using the method 200). In some embodiments, the search index 126 may include keywords extracted from the sensitive file 112a (as well as keywords extracted from other sensitive files that are to be encrypted using the method 200).

The method 200 may include, at action 206, encrypting the search index using an encryption key. For example, the security application 114 may encrypt, at action 206, the search index 126 using the encryption key 116. For example, the search index 126 may be encrypted using Triple Data Encryption Algorithm (TDEA), Advanced Encryption Standard (AES), or another encryption algorithm.

The method 200 may include, at action 208, encrypting the sensitive file using the encryption key. For example, the security application 114 may encrypt, at action 208, the sensitive file 112a using the encryption key 116, resulting in the encrypted sensitive file 113a. Alternatively, action 208 may include encrypting the sensitive file 112a using a unique encryption key that is specific to the sensitive file 112a, and then encrypting the unique encryption key with the encryption key 116. This encryption may be accomplished using TDEA, AES, or another encryption algorithm.

The method 200 may include, at action 210, sending the encryption key and, at action 212, receiving the encryption key. For example, the security application 114 may send, at action 210, and the authentication application 128 may receive, at action 212, the encryption key 116 that was used, at action 206, to encrypt the encrypted sensitive file 113a.

In some embodiments, actions 202-212 may be performed during an initialization of the method 200 on the network device 104 when the network device 104 is in a known clean state and guaranteed to not be infected with any malicious application. Further, in some embodiments, the security application 114 may be dissolvable. For example, once actions 202-212 (or in some embodiments actions 202-214) are performed, the security application 114 may be configured to be dissolved (e.g., deleted or erased) from the network device 104.

The method 200 may include, at action 214, initializing an SGX enclave. In some embodiments, the initializing, at the network device, of the SGX enclave may include initializing, at the network device, of the SGX enclave using an Intel® processor of the network device that supports Intel® SGX instructions. Alternatively, in some embodiments, the initializing, at the network device, of the SGX enclave may include initializing, at the network device, of the SGX enclave using an OpenSGX simulator, or a Komodo monitor, that supports Intel® SGX instructions. For example, the security application 114, or other application, may initialize, at action 214, the SGX enclave 118 using an Intel® processor of the network device 104 that supports Intel® SGX instructions or using an OpenSGX simulator, or a Komodo monitor, that supports Intel® SGX instructions.

The method 200 may include, at action 216, loading a retrieval application into the SGX enclave. For example, the security application 114, or other application, may load, at action 216, the retrieval application 120 into the SGX enclave 118.

The method 200 may include, at action 218, sending and, at action 220, receiving an attestation that the retrieval application is authentic. For example, the authentication application 128 may send, at action 218, and the retrieval application 120 may receive, at action 220, an attestation that the retrieval application 120 is authentic.

The method 200 may include, at action 222, sending the encryption key and, at action 224, receiving the encryption key. For example, the authentication application 128 may send, at action 222, and the retrieval application 120 may receive, at action 224, the encryption key 116.

The method 200 may include, at action 226, receiving a user request to search the encrypted sensitive file. For example, the retrieval application 120 may receive, at action 226, a user request to search the encrypted sensitive file 113a.

The method 200 may include, at action 228, authenticating the user request based on a user credential provided by the user. For example, the retrieval application 120 may authenticate, at action 228, the user request based on the user credential 122 provided by the user. In some embodiments, the user credential 122 may include a password specific to the user and/or a username/password combination specific to the user.

The method 200 may include, at action 230, authenticating the user request based on a second factor authentication key provided by the user. For example, the retrieval application 120 may authenticate, at action 230, the user request based on the second factor authentication key 124 provided by the user.

In some embodiments, the second factor authentication key 124 may be generated at the authentication server 106 by the authentication application 128. The authentication application 128 may then send the second factor authentication key 124 to both the retrieval application 120 as well as to the security application 114 or other application accessible to the user. Then, the user may provide the second factor authentication key 124 to the retrieval application 120 to enable the retrieval application 120 to determine that the user request is authentic by determining that the second factor authentication key 124 received from the authentication server 106 matches the second factor authentication key 124 received from the user match.

In some embodiments, the second factor authentication key 124 may be based generated using a pseudo random number generator (PRNG) and a PRNG seed. Employing a PRNG seed may enable further second faction authentication attempts to be validated locally at the network device 104 even if the network device 104 goes offline and is no longer in communication with the authentication server 106.

In some embodiments, the encrypted sensitive file 113a may be wrapped with a wrapper or may include an extension that indicates to the user that the file is encrypted. For example, the encrypted sensitive file 113a may be wrapped with an HTML wrapper that causes an HTML page to open in a browser when a user requests access to the encrypted sensitive file 113a, with the HTML page requiring the user to enter the second factor authentication key (which is then provided to the retrieval application for authentication) before access is granted. In some embodiments, the authentication at action 230 may be configured to time out so that the authentication expires regularly and so that the user is regularly required to provide a second factor authentication key to continue accessing encrypted sensitive files.

The method 200 may include, at action 232, decrypting the search index using the encryption key. For example, the retrieval application 120 may decrypt, at action 232, the search index 126. In some embodiments, encrypting the search index 126 at action 206 and decrypting the search index at action 232 results in the search index 126 being secured and only accessible to the retrieval application 120 and not accessible to any malicious applications, such as the malicious application 115.

The method 200 may include, at action 234, searching the search index based on the user request to produce search results. For example, the retrieval application 120 may search, at action 234, the search index 126 in order to produce search results that list the encrypted sensitive file or files that match user specified search parameters, such as search keywords.

The method 200 may include, at action 236, receiving a user request to decrypt the encrypted sensitive file based on a selection of one of the search results. For example, the retrieval application 120 may receive, at action 236, a user request to decrypt the encrypted sensitive file 113a based on a user selecting the encrypted sensitive file 113a from among the search results.

The method 200 may include, at action 238, decrypting the encrypted sensitive file. For example, the retrieval application 120 may decrypt, at action 238, the encrypted sensitive file 113a using the encryption key 116, resulting in the sensitive file 112a. Alternatively, action 238 may include decrypting a unique key (that was used to encrypt the encrypted sensitive file 113a) using the encryption key 116, such as where the unique key is stored in an encrypted key storage file, and then using the unique encryption key to decrypt the encrypted sensitive file 113a, resulting in the sensitive file 112a.

The method 200 may include, at action 240, providing the sensitive file to the user. For example, the retrieval application 120 may provide, at action 240, the sensitive file 112a to the user by presenting the sensitive file 112a to the user on a display of the user device or sending the sensitive file 112a to a user specified location over the network 102.

In some embodiments, actions 226-240 may be performed while the network device is online and maintains network communication with the authentication server. For example, actions 226-240 may be performed while the network device 104 is online and maintains network communication with the authentication server 106. In these embodiments, the authentication at action 228 and/or at action 230 may be performed with assistance from the authentication server 106.

Alternatively, in some embodiments, one or more of actions 226-240 may be performed while the network device is offline and does not maintain network communication with the authentication server. For example, one or more of actions 226-240 may be performed while the network device 104 is offline and does not maintain network communication with the authentication server 106. In these embodiments, the authentication at action 228 and/or at action 230 may be performed without assistance from the authentication server 106. For example, as long as the retrieval application 120 is loaded at action 216 and attested at action 220 and the encryption key 116 is received at action 224 while the network device 104 is online, the method 200 may enable one or more of the subsequent actions 226-240 to be performed while the network device 104 is offline.

The method 200 may thus be employed, in some embodiments, to encrypt and decrypt the sensitive file 112a on the network device 104 to prevent the malicious application 115 from accessing sensitive data from the sensitive file 112a. In some embodiments of the method 200, instead of encrypting all files stored on the network device 104 (including non-sensitive files), only sensitive files may be encrypted, thus avoiding the time and processing resources that may be required to encrypt and decrypt non-sensitive files. Also, in these embodiments of the method 200, before sensitive files are encrypted, the search index 126 of the data in the sensitive files may be built and then this search index 126 may be employed after the sensitive files are encrypted to allow a user to securely search through the encrypted sensitive files without first decrypting the sensitive files, which may maintain the user's ability to quickly find a particular sensitive file with particular data. Therefore, employing these embodiments of the method 200 may prevent the malicious application 115 from accessing and stealing any sensitive data stored in any sensitive files without being overly burdensome for a user of the network device 104.

Although the actions of the method 200 are illustrated in FIGS. 2A-2B as discrete actions, various actions may be divided into additional actions, combined into fewer actions, reordered, expanded, or eliminated, depending on the desired implementation. For example, in some embodiments, the actions of the method 200 may be performed without performing the search-specific actions 204, 206, 226, 232, and 234, and with the user request received at action 236 not being based on a selection of one of the search results (and possibly being performed before action 228). Also, in some embodiments, actions 214-240 may be performed without performing actions 202-212, or with actions 202-212 having been performed previously.

Also, it is understood that in some embodiments the method 200 may be employed to encrypt and decrypt multiple sensitive files. In these embodiments, each of the sensitive files may be encrypted using a unique encryption key that is specific to the file, and the unique encryption keys may be stored in a key storage file. The key storage file and the search index may then be encrypted using an encryption key, which may be sent to the authentication server, and then later securely provided to the retrieval application in the SGX enclave to be used to decrypt the search index and to decrypt the key storage file so that the retrieval application can use the unique keys to decrypt the encrypted sensitive files. Further, for each user request received to access one or more of the decrypted sensitive files, the user may be required to provide a second factor authentication key to the retrieval application, or a second factor authentication key may need to be accessed by the retrieval application with a notification to the user, in order to prevent the retrieval application from responding to a malicious application that makes a request to access an encrypted sensitive file, or in order for the user to at least be notified if such a request is made by a malicious application.

Also, in some embodiments, the retrieval program may be configured to predict encrypted sensitive files that a user will request, and the retrieval program may pre-fetch and decrypt these encrypted sensitive files within the SGX enclave to speed up access to these sensitive files once the sensitive files are actually requested by the user.

Further, it is understood that the method 200 may improve the functioning of a computer system itself. For example, the functioning of the network device 104 of FIG. 1 may itself be improved by the method 200. For example, the network device 104 may be improved by the method 200 employing encryption and decryption of a sensitive file to avoid the malicious application 115 from accessing and stealing sensitive data from the sensitive file. The method 200 may be more effective than conventional methods which encrypt all files stored on a network device which may be overly burdensome for a user of the network device.

Also, the method 200 may improve the technical field of securing network devices. Selectively encrypting only sensitive files, and then allowing a user to securely decrypted selected sensitive files using an SGX enclave may prevent malicious applications from accessing and stealing any sensitive data stored in any sensitive files without being overly burdensome for a user of the network device.

FIG. 3 illustrates an example computer system 300 that may be employed in encrypting and decrypting sensitive files on a network device. In some embodiments, the computer system 300 may be part of any of the systems or devices described in this disclosure. For example, the computer system 300 may be part of the network device 104 or the authentication server 106 of FIG. 1.

The computer system 300 may include a processor 302, a memory 304, a file system 306, a communication unit 308, an operating system 310, a user interface 312, and a module 314, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 302 may include any suitable special-purpose or general-purpose computer, computing entity, or processing device including various computer hardware or software modules and may be configured to execute instructions stored on any applicable computer-readable storage media. For example, the processor 302 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 302 may interpret and/or execute program instructions and/or process data stored in the memory 304 and/or the file system 306. In some embodiments, the processor 302 may fetch program instructions from the file system 306 and load the program instructions into the memory 304. After the program instructions are loaded into the memory 304, the processor 302 may execute the program instructions. In some embodiments, the instructions may include the processor 302 performing one or more actions of the method 200 of FIGS. 2A-2B.

The memory 304 and the file system 306 may include computer-readable storage media for carrying or having stored thereon computer-executable instructions or data structures. Such computer-readable storage media may be any available non-transitory media that may be accessed by a general-purpose or special-purpose computer, such as the processor 302. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 302 to perform a certain operation or group of operations, such as one or more actions of the method 200 of FIGS. 2A-2B. These computer-executable instructions may be included, for example, in the operating system 310, in one or more applications, such as the module 314, or in some combination thereof.

The communication unit 308 may include any component, device, system, or combination thereof configured to transmit or receive information over a network, such as the network 102 of FIG. 1. In some embodiments, the communication unit 308 may communicate with other devices at other locations, the same location, or even other components within the same system. For example, the communication unit 308 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 308 may permit data to be exchanged with a network and/or any other devices or systems, such as those described in the present disclosure.

The operating system 310 may be configured to manage hardware and software resources of the computer system 300 and configured to provide common services for the computer system 300.

The user interface 312 may include any device configured to allow a user to interface with the computer system 300. For example, the user interface 312 may include a display, such as an LCD, LED, or other display, that is configured to present video, text, application user interfaces, and other data as directed by the processor 302. The user interface 312 may further include a mouse, a track pad, a keyboard, a touchscreen, volume controls, other buttons, a speaker, a microphone, a camera, any peripheral device, or other input or output device. The user interface 312 may receive input from a user and provide the input to the processor 302. Similarly, the user interface 312 may present output to a user.

The module 314 may be one or more computer-readable instructions stored on one or more non-transitory computer-readable media, such as the memory 304 or the file system 306, that, when executed by the processor 302, is configured to perform one or more actions of the method 200 of FIGS. 2A-2B. In some embodiments, the module 314 may be part of the operating system 310 or may be part of an application of the computer system 300, or may be some combination thereof. In some embodiments, the module 314 may function as the security application 114, the retrieval application 120, and/or the authentication application 128 of FIG. 1.

Modifications, additions, or omissions may be made to the computer system 300 without departing from the scope of the present disclosure. For example, although each is illustrated as a single component in FIG. 3, any of the components 302-314 of the computer system 300 may include multiple similar components that function collectively and are communicatively coupled. Further, although illustrated as a single computer system, it is understood that the computer system 300 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 302 of FIG. 3) including various computer hardware or software modules, as discussed in greater detail below. Further, as indicated above, embodiments described herein may be implemented using computer-readable media (e.g., the memory 304 or file system 306 of FIG. 3) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an"

limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for encrypting and decrypting sensitive files on a network device, at least a portion of the method being performed by a computing device comprising one or more processors, the method comprising:
    (a) determining, at a network device, that a file stored on the network device is a sensitive file;
    (b) encrypting, at the network device, the sensitive file;
    (c) sending, to an authentication server, an encryption key;
    (d) initializing, at the network device, a Software Guard Extension (SGX) enclave;
    (e) loading, into the SGX enclave, a retrieval application;
    (f) receiving, at the retrieval application, an attestation from the authentication server that the retrieval application is authentic;
    (g) receiving, at the retrieval application, the encryption key from the authentication server;
    (h) receiving, at the retrieval application, a user request to decrypt the encrypted sensitive file;
    (i) authenticating, at the retrieval application, the user request based on a user credential provided by the user;
    (j) authenticating, at the retrieval application, the user request based on a second factor authentication key provided by the user;
    (k) decrypting, at the network device, the encrypted sensitive file; and
    (l) providing the sensitive file to the user.

2. The method of claim 1, wherein the determining, at the network device, that the file stored on the network device is a sensitive file comprises identifying the file in a list of previously-identified sensitive files.

3. The method of claim 2, wherein the list of previously-identified sensitive files excludes files that are accessed within a particular frequency.

4. The method of claim 1, wherein the initializing, at the network device, of the SGX enclave comprises initializing, at the network device, of the SGX enclave using an Intel® processor of the network device that supports Intel® SGX instructions.

5. The method of claim 1, wherein the initializing, at the network device, of the SGX enclave comprises initializing, at the network device, of the SGX enclave using an OpenSGX simulator, or a Komodo monitor, that supports Intel® SGX instructions.

6. The method of claim 1, wherein (h)-(l) are performed while the network device is online and maintains network communication with the authentication server.

7. The method of claim 1, wherein one or more of (h)-(l) are performed while the network device is offline and does not maintain network communication with the authentication server.

8. A computer-implemented method for encrypting and decrypting sensitive files on a network device, at least a portion of the method being performed by a computing device comprising one or more processors, the method comprising:
    (a) determining, at a network device, that a file stored on the network device is a sensitive file;
    (b) building, at the network device, a search index of the sensitive file;
    (c) encrypting, at the network device, the search index using an encryption key;
    (d) encrypting, at the network device, the sensitive file;
    (e) sending, to an authentication server, the encryption key;
    (f) initializing, at the network device, a Software Guard Extension (SGX) enclave;
    (g) loading, into the SGX enclave, a retrieval application;
    (h) receiving, at the retrieval application, an attestation from the authentication server that the retrieval application is authentic;
    (i) receiving, at the retrieval application, the encryption key from the authentication server;
    (j) receiving, at the retrieval application, a user request to search the encrypted sensitive file;

(k) authenticating, at the retrieval application, the user request based on a user credential provided by the user;

(l) authenticating, at the retrieval application, the user request based on a second factor authentication key provided by the user;

(m) decrypting, at the retrieval application, the search index using the encryption key;

(n) searching, at the retrieval application, the search index based on the user request to produce search results;

(o) receiving, at the retrieval application, a user request to decrypt the encrypted sensitive file based on a selection of one of the search results;

(p) decrypting, at the network device, the encrypted sensitive file; and (q) providing the sensitive file to the user.

9. The method of claim 8, wherein the determining, at the network device, that the file stored on the network device is a sensitive file comprises identifying the file in a list of previously-identified sensitive files.

10. The method of claim 9, wherein the list of previously-identified sensitive files excludes files that are accessed within a particular frequency.

11. The method of claim 8, wherein the initializing, at the network device, of the SGX enclave comprises initializing, at the network device, of the SGX enclave using an Intel® processor of the network device that supports Intel® SGX instructions.

12. The method of claim 8, wherein the initializing, on the network device, of the SGX enclave comprises initializing, on the network device, of the SGX enclave using an OpenSGX simulator, or a Komodo monitor, that supports Intel® SGX instructions.

13. The method of claim 8, wherein (j)-(q) are performed while the network device is online and maintains network communication with the authentication server.

14. The method of claim 8, wherein one or more of (j)-(q) are performed while the network device is offline and does not maintain network communication with the authentication server.

15. One or more non-transitory computer-readable media comprising one or more computer-readable instructions that, when executed by one or more processors of one or more computing devices, cause the one or more computing devices to perform a method for encrypting and decrypting sensitive files on a network device, the method comprising:

(a) determining, at a network device, that a file stored on the network device is a sensitive file;

(b) encrypting, at the network device, the sensitive file;

(c) sending, to an authentication server, an encryption key;

(d) initializing, at the network device, a Software Guard Extension (SGX) enclave;

(e) loading, into the SGX enclave, a retrieval application;

(f) receiving, at the retrieval application, an attestation from the authentication server that the retrieval application is authentic;

(g) receiving, at the retrieval application, the encryption key from the authentication server;

(h) receiving, at the retrieval application, a user request to decrypt the encrypted sensitive file;

(i) authenticating, at the retrieval application, the user request based on a user credential provided by the user;

(j) authenticating, at the retrieval application, the user request based on a second factor authentication key provided by the user;

(k) decrypting, at the network device, the encrypted sensitive file; and (l) providing the sensitive file to the user.

16. The one or more non-transitory computer-readable media of claim 15, wherein:

the determining, at the network device, that the file stored on the network device is a sensitive file comprises identifying the file in a list of previously-identified sensitive files; and the list of previously-identified sensitive files excludes files that are accessed within a particular frequency.

17. The one or more non-transitory computer-readable media of claim 15, wherein the initializing, at the network device, of the SGX enclave comprises initializing, at the network device, of the SGX enclave using an Intel® processor of the network device that supports Intel® SGX instructions.

18. The one or more non-transitory computer-readable media of claim 15, wherein the initializing, at the network device, of the SGX enclave comprises initializing, at the network device, of the SGX enclave using an OpenSGX simulator, or a Komodo monitor, that supports Intel® SGX instructions.

19. The one or more non-transitory computer-readable media of claim 15, wherein:

the method further comprises (a.1) building, at the network device, a search index of the sensitive file;

the method further comprises (a.2) encrypting, at the network device, the search index using the encryption key;

the method further comprises (g.1) receiving, at the retrieval application, a user request to search the encrypted sensitive file;

the method further comprises (j.1) decrypting, at the retrieval application, the search index;

the method further comprises (j.2) searching, at the retrieval application, the search index based on the user request to produce search results; and the receiving at (h) comprises receiving, at the retrieval application, the user request to decrypt the encrypted sensitive file based on a selection of one of the search results.

20. The one or more non-transitory computer-readable media of claim 15, wherein one or more of (h)-(l) are performed while the network device is offline and does not maintain network communication with the authentication server.

* * * * *